United States Patent [19]

Mentani et al.

[11] 4,425,770
[45] Jan. 17, 1984

[54] STEERING LOCK ASSEMBLY

[76] Inventors: Akiyoshi Mentani, c/o Yuhshin Co., Ltd. (Hiroshima Factory), 1269, Dairiki, Higashikaita, Kaita-cho; Hiromasa Nakamoto, c/o Toyo Kogyo Co., Ltd., 3-1, Shinchi, Fuchu-cho, both of Aki-gun, Hiroshima-ken, Japan

[21] Appl. No.: 251,282

[22] Filed: Apr. 6, 1981

[30] Foreign Application Priority Data

Apr. 5, 1980 [JP] Japan ................................. 55-44921

[51] Int. Cl.³ ...................... B60R 25/02; E05B 29/02; E05B 65/12
[52] U.S. Cl. ........................................ 70/252; 70/186; 70/367; 70/372; 70/377; 70/DIG. 62
[58] Field of Search ................. 70/370, 367, 186, 252, 70/377, 375, 376, 372, DIG. 62

[56] References Cited

U.S. PATENT DOCUMENTS

| | | | |
|---|---|---|---|
| 1,805,891 | 5/1931 | Shinn | 70/377 X |
| 1,850,323 | 3/1932 | Heyer | 70/377 X |
| 1,900,794 | 3/1933 | Brun | 70/DIG. 62 |
| 1,990,934 | 2/1935 | Falk | 70/369 |
| 2,023,208 | 12/1935 | Olson | 70/377 X |
| 2,922,298 | 1/1960 | Wiener | 70/367 |
| 3,260,080 | 7/1966 | Wellekens | 70/367 X |
| 3,520,161 | 7/1970 | Jacobi | 70/372 X |
| 3,641,489 | 2/1972 | Shimomura | 70/252 X |
| 3,782,145 | 1/1974 | Wolter | 70/186 |
| 3,789,636 | 2/1974 | Nakashima | 70/252 |
| 3,794,796 | 2/1974 | Dwan | 70/252 X |

FOREIGN PATENT DOCUMENTS

| | | | |
|---|---|---|---|
| 2035282 | 1/1972 | Fed. Rep. of Germany | 70/252 |
| 2047702 | 3/1972 | Fed. Rep. of Germany | 70/252 |
| 2613208 | 10/1977 | Fed. Rep. of Germany | 70/252 |
| 417458 | 1/1947 | Italy | 70/186 |
| 1041581 | 9/1966 | United Kingdom | 70/252 |
| 1411377 | 10/1975 | United Kingdom | 70/252 |
| 1430370 | 3/1976 | United Kingdom | 70/252 |
| 2018882 | 10/1979 | United Kingdom | 70/252 |

*Primary Examiner*—Robert L. Wolfe
*Assistant Examiner*—Carl F. Pietruszka
*Attorney, Agent, or Firm*—Wenderoth, Lind & Ponack

[57] ABSTRACT

A steering lock assembly for use in an automobile comprises a cylinder lock plug for controlling an ignition switch assembly with a mating key inserted in the cylinder lock plug and a steering shaft lock operatively associated with the cylinder lock plug for selectively locking and unlocking an automobile steering shaft. The cylinder lock plug comprises a key-operated barrel and the steering shaft lock comprises a locking member. As an element for transmitting rotation of the barrel, which is effected by turning the mating key inserted therein, to the locking member, a cam member is utilized, which cam member is integrally formed with the barrel.

9 Claims, 10 Drawing Figures

STEERING LOCK ASSEMBLY

BACKGROUND OF THE INVENTION

The present invention generally relates to a steering lock assembly and, more particularly, to a steering lock assembly of a type utilizing a cylinder lock and a steering shaft lock operatively associated with the cylinder lock for selectively locking and unlocking an automobile steering shaft.

Figure 1:
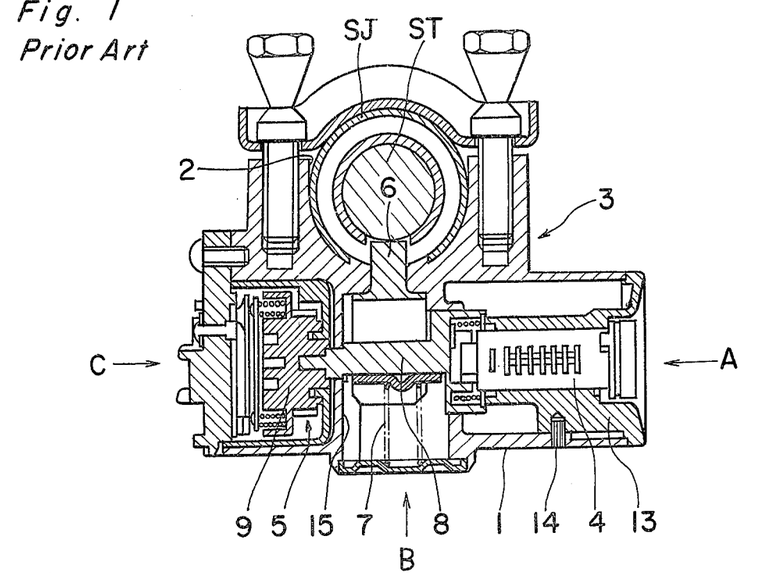
FIG. 1 is a longitudinal sectional view of the prior art steering lock assembly, reference to which has already been made.

An example of a prior art steering lock assembly which appears to be pertinent to the present invention is shown in FIG. 1 of the accompanying drawings in a longitudinal sectional view, reference to which will first be made for the discussion of the prior art.

The prior art steering column lock assembly shown in FIG. 1 comprises a lock housing 3 including a cylindrical extension 1 and a generally U-shaped mounting part 2 through which the lock assembly is secured to an automobile steering column through which a steering shaft rotatably extends. The cylindrical extension 1 accommodates a cylinder lock 4 at one end thereof and an ignition switch assembly 5 at the opposite end thereof and also accommodates a locking bolt 6, which can selectively protrude into and retract from the U-shaped recess in the mounting part 2 in a direction perpendicular to the longitudinal axis of the cylindrical extension 1 respectively for locking and unlocking the steering shaft, which locking bolt 6 is located within an intermediate space between the cylinder lock 4 and the ignition switch assembly 5. This locking bolt 6 is normally biased by a compression spring 7 so as to assume a locked position in which the locking bolt protrudes into the U-shaped recess to lock the steering shaft and is operatively coupled to a cam member 8 rotatable together with the plug of the cylinder lock 4, said cam member 8 having an actuating projection integrally formed therewith and operatively coupled to a rotor 9 of the ignition switch assembly 5 for controlling the latter according to the direction of rotation of the plug of the cylinder lock 4 which is effected by turning a mating key inserted in the plug of the cylinder lock 4.

The prior art lock assembly also comprises, although not shown, a retaining mechanism for retaining the locking bolt 6 in an unlocked position once the locking bolt 6 has been moved thereto by the rotation of the plug of the cylinder lock 4 in one direction and so long as the key is not removed or withdrawn from the plug of the cylinder lock 4 even though the latter has subsequently been rotated in the reverse direction back to the original position.

In the construction described above and shown in FIG. 1, a relatively complicated and time-consuming procedure is required to assemble the various component parts together to provide a complete steering lock assembly. By way of example, relative to the cylindrical extension 1, the cam member 8 and the cylinder lock 4 are successively inserted in a direction shown by arrow A into one end of the cylindrical extension 1, the locking bolt 6 and the compression spring 7 are successively inserted in a direction shown by arrow B, and the ignition switch assembly 5 is mounted in the direction shown by arrow C and counter to the mounting direction A. This three-direction assembly system requires not only a complicated and time-consuming procedure, but also an increased number of component parts of the lock assembly which in turn results in an increased weight of the lock assembly.

Specifically, the three-direction assembly system requires the use of separate fixing elements or fixtures to hold the respective component parts in position and, depending on the arrangement of the fixtures, some component part of the lock assembly have to be separate members. This will be explained by way of example with further reference to FIG. 1.

In order to secure a sufficient stroke of movement of the locking bolt 6 between the locked and unlocked postions, the plug of the cylinder lock 4 and the cam member 8 have to be separate members and such is the case with the prior art lock assembly shown in FIG. 1. In addition, in order to connect the plug of the cylinder lock 4 effectively with the cam member 8 so that the rotation of the plug of the cylinder lock 4 can be transmitted to the locking bolt 6 through the cam member 8, that portion of the cam member 8 which is connected to the plug of the cylinder lock 4 must be of a relatively large diameter, requiring the employment of a relatively large chamber in the cylindrical extension 1 for the accommodation of the cylinder lock 4 so that the cam member 8 can be inserted into the intermediate space through the large chamber. The employment of the large chamber for the cylinder lock 4 necessitates the employment of a cylinder portion 13. The cylinder portion 13 forms a part of the cylinder lock 4 together with the plug rotatably housed within the sleeve 13 and is, after having been inserted into the large bore in the extension 1, held in position by means of one or more cotter pins 14. Furthermore, in order to retain the ignition switch assembly 5 in position inside the lock housing 3 at a position on one side of the locking bolt 6 opposite to the cylinder lock 4, the lock housing 3 is required to be provided with a partition wall 15 separating the intermediate space from a chamber for the ignition switch assembly 5 and to which the ignition switch assembly 5 is, after having been inserted into such chamber, engaged to assume a proper position inside the lock housing 3.

Apart from the prior art steering lock assembly of the construction shown in FIG. 1, the British patent specification No. 1,512,809, published on June 1, 1978, discloses a steering lock wherein the cam member is integrally formed with the plug forming a part of the cylinder lock. However, the cam member used therein is of a size larger in diameter than the plug and, therefore, the cylinder lock used therein necessitates the employment of the cylinder portion discussed above.

A cylinder lock which does not require the use of the cylinder portion is disclosed, for example, in the British patent specification No. 1,455,444, published on Nov. 10, 1976. However, since this patent specification is directed to means for preventing the plug of the cylinder lock from being removed by an unauthorized person, this patent specification is silent as to the details of how the cylinder lock is operatively associated with the locking bolt.

SUMMARY OF THE INVENTION

Accordingly, the present invention has been developed with a view to substantially eliminating the disadvantages and inconveniences inherent in the prior art steering lock assemblies and is intended to provide an improved steering lock assembly which does not require a complicated and time-consuming assembly procedure and can readily be assembled with a minimum number of component parts.

Another important object of the present invention is to provide an improved steering lock assembly of the type referred to above, which is reliable in performance and can be manufactured at a substantially reduced cost.

According to the present invention, there is provided a steering lock assembly comprising a lock housing including a cylindrical portion having an axial bore defined therein, said axial bore being constituted by a plug chamber, an intermediate chamber and a switch chamber all axially aligned with each other, and a mounting part having a guide opening defined therein in communication with the intermediate chamber and movably supporting a locking member for selectively locking and unlocking an automobile steering shaft. The plug chamber accommodates therein a plug which with the cylindrical portion constitutes a cylinder lock and a generally elongated cam member integrally formed therewith and protruding from one end of the plug into the switch chamber across the intermediate chamber for engagement with a rotor of a key-operated switch assembly housed within the switch chamber.

The cam member integral with the plug controls the movement of a slide member between locked and unlocked positions in such a way that, when a mating key inserted in the plug is rotated from an inoperative position towards an operative position and from the operative position back towards the inoperative position, the slide member is moved from the unlocked position towards the locked position and from the locked position back towards the unlocked position, respectively. Since the slide member is coupled with the locking member for movement together therewith, the locking member is held in position to lock the steering shaft when the slide member is in the locked position and in position to unlock the steering shaft when the slide member is in the unlocked position.

A retaining mechanism is also provided for retaining the slide member in the unlocked position once the slide member has been moved thereto by the rotation of the plug from the inoperative position to the operative position and so long as the key is not removed or withdrawn from the plug even though the plug has subsequently been rotated from the operative position to the inoperative position, but releasing the slide member from the unlocked position to allow it to move towards the locked position upon withdrawal of the key from the plug.

In the construction according to the present invention, the lock assembly can be fabricated by inserting the plug with the cam member into the plug chamber through the switch chamber and then through the intermediate chamber, then inserting the slide member into the intermediate chamber through the switch chamber while the locking member is inserted through the guide opening so as to permit the inner end of the locking member to be coupled to the slide member being inserted into the intermediate chamber, and finally inserting the key-operated switch assembly into the switch chamber with the free end of the cam member engaged in the rotor. While the cam member held in position inside the intermediate chamber concurrently serves as means for avoiding any possible axial displacement of the plug in a direction towards the plug chamber in addition to means for transmitting the rotation of the plug to the slide member, the plug carries means for avoiding any possible axial displacement of the plug in a direction away from the plug chamber.

Thus, it is clear that, according to the present invention, essential and important component parts of the steering column lock assembly can be fabricated or assembled into the cylindrical portion substantially in one direction axially of the cylindrical portion. Therefore, as compared with the three-direction assembly system referred to above, the number of the separate component parts of the lock assembly can advantageously be minimized with consequent reduction in weight and manufacturing cost.

BRIEF DESCRIPTION OF THE DRAWINGS

These and other objects and features of the present invention will become apparent from the following description of a preferred embodiment thereof and with reference to the accompanying drawings, in which.

DETAILED DESCRIPTION OF EMBODIMENT

Before the description of the present invention proceeds, it is to be noted that like parts are designated by like reference numerals throughout the accompanying drawings except for FIG. 1.

Figure 2:
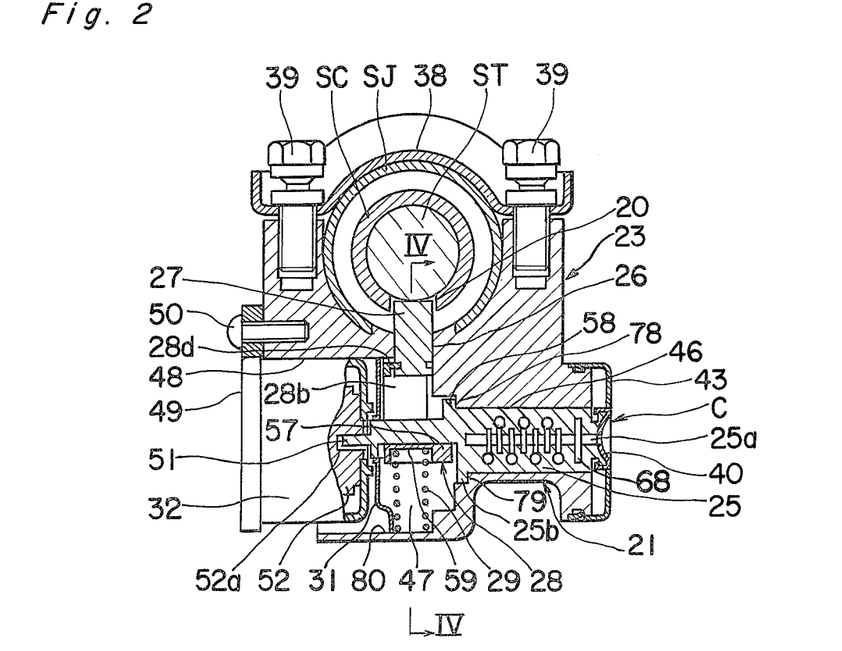
FIG. 2 is a longitudinal sectional view of a steering lock assembly according to the present invention.
Figure 3:
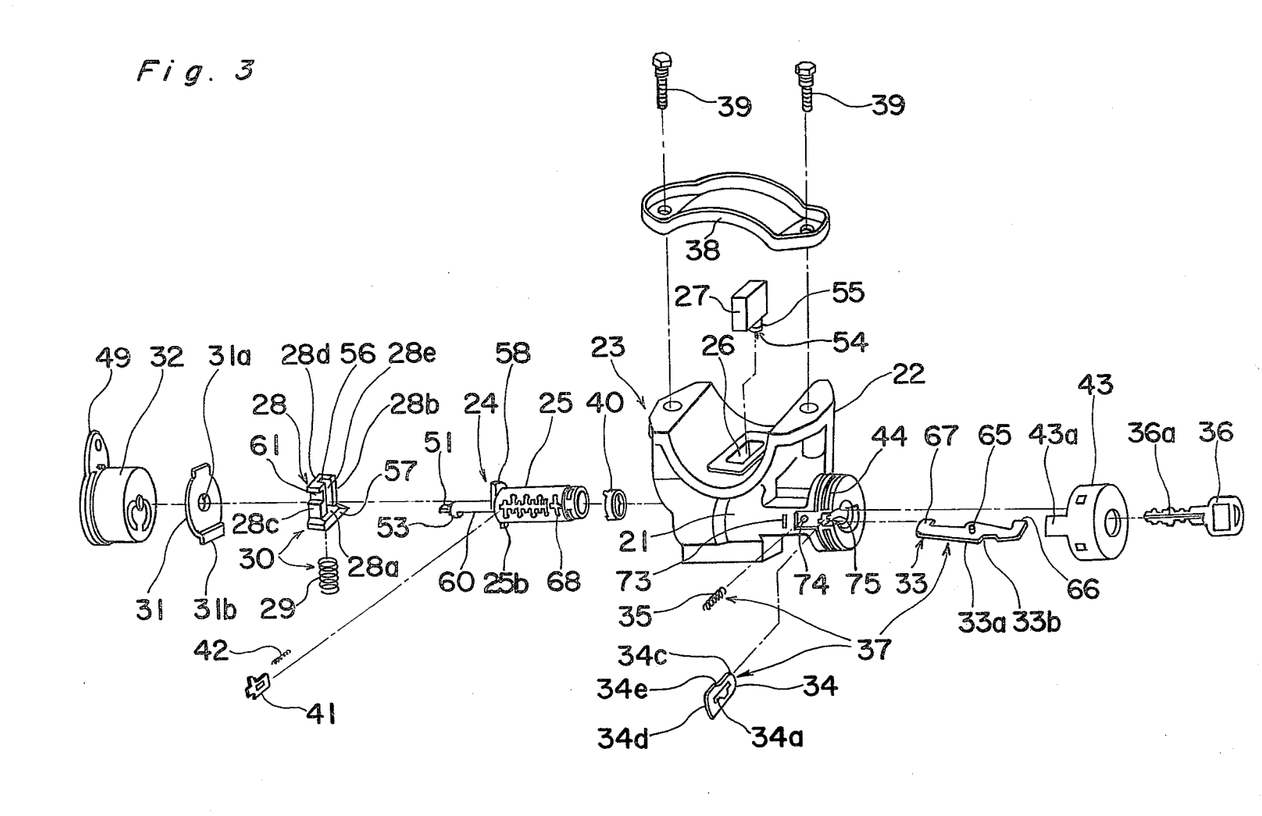
FIG. 3 is an exploded view of the steering column lock assembly shown in FIG. 2.

Referring first to FIGS. 2 and 3, a steering lock assembly according to the present invention basically comprises a lock housing 23 made of metal and formed into one-piece construction having a generally cylindrical portion 21, having an axial bore defined therein and composed of a plug chamber 46, an intermediate chamber 47 and a switch chamber 48 all coaxially communicated with each other, and a generally U-shaped or semi-circularly cross-sectioned mounting portion 22 protruding laterally outwardly from the cylindrical portion 21; a plug C housed in the plug chamber 46 and carrying a cam member 24 protruding axially therefrom towards the switch chamber 48 across the intermediate chamber 47; an elongated locking bolt or member 27 for selectively locking and unlocking an automobile steering shaft ST; a drive device 30 comprising a slide member 28 housed within the intermediate chamber 47 for movement between locked and unlocked positions together with the locking bolt 27 in a direction perpendicular to the longitudinal axis of the cylindrical portion 21 and a biasing spring 29 for urging the slide member 28 towards the locked position; a partition wall member 31 fixedly positioned between the intermediate chamber 47 and the switch chamber 48 and forming a guide wall for guiding the movement of the slide member 28; a key-operated rotary switch assembly 32 of any known construction fixedly housed within the switch chamber 48 and having a rotor coupled to the cam member 24 for rotation together therewith; and a retaining mechanism 37 positioned within the plug chamber 46 and generally laterally of the plug C for retaining the slide member 28 in the unlocked position together with the locking bolt 27 once said slide member 28 has been moved thereto by the rotation of the plug C in one direction with a mating key 36 inserted in said plug C and so long as the key 36 is not removed or withdrawn from the plug C even though the latter has subsequently been rotated in the reverse direction back to the original position, said retaining mechanism including rocking pawl 33, a generally elongated slidable plate 34 and a biasing spring 35.

The lock housing 23 is, in a manner as is well known to those skilled in the art, fixedly mounted on a steering column SJ by the use of a clamp member 38 secured to the mounting portion 22 by means of set bolts 39 while the steering column SJ with the steering shaft ST extending coaxially therethrough extends through a circular opening defined between the mounting portion 22 and the clamp member 38. This lock housing 23 thus illustrated is so designed that, when the steering lock is mounted on the steering column SJ in the manner as hereinbefore described, the longitudinal axis cylindrical portion 21 lies in a plane at right angles to that of the steering shaft ST rotatably extending inside the steering column SJ. The steering shaft ST has a collar SC rigidly mounted thereon for rotation together therewith, said collar SC having a detent recess 20 defined therein for receiving the locking bolt 27, when the latter is moved to the locked position, to lock the steering shaft ST in a neutral position in a manner as will be described later.

As is the case with the conventional plug, the plug C comprises a barrel 25 having a key groove 25a defined therein and extending inwardly from the end face thereof on the opposite end from the intermediate chamber 47, said barrel 25 also having a plurality of, for example, seven, pairs of tumbler plates 41 and their associated return springs 42, each of said tumbler plates 41 being movable in a direction perpendicular to the key groove 25a between engaged and disengaged positions and being normally biased to assume the engaged position by the action of the corresponding spring 42. These tumbler plates 41 are so designed and so sized that, in the absence of the key 36 in the key groove 25a, all of the tumbler plates 41 are biased by the associated springs 42 to the respective engaged positions with their ends engaged in an axial groove (not shown) defined in the wall of the cylindrical portion 21 facing the plug chamber 46 thereby to hold the barrel 25 against rotation relative to the cylinder block 21, said tumbler plates 41 being, however, moved to the respective disengaged positions against the associated return springs 42, when the mating key 36 is inserted into the key groove 25a, to permit the barrel 25 to be rotatable together with the mating key 36. Although the plug C itself may be of any known construction, the barrel 25 employed therein according to the present invention is formed integrally with, and therefore, is a one-piece construction together with the cam member 24 of a construction as will be described later.

The cam member 24 is constituted by an elongated cam body 60 of generally semi-circular cross section having one end integral with the barrel 25 and formed with a radially outwardly extending cam projection 58 engageable with the slide member 28 in a manner as will be described later, the other end of said cam body 60 having an integral support disc 53 thereon which in turn has an integral actuator projection 51 protruding therefrom in a direction opposite to the barrel 25 in coaxial relation to the longitudinal axis of the barrel 25. The actuator projection 51 is in turn engaged in an engagement recess 52a defined in the rotor 52 of the rotary switch assembly 32 so that the rotor 52 is rotated together with the barrel 25. For the reason as will become clear from the subsequent description, the barrel 25 has a stop projection 25b radially outwardly protruding from the end of the barrel 25 adjacent the cam member 24, which stop projection 25b is positioned diametrically opposite the cam projection 58.

Figures 7, 8, 9, 10:
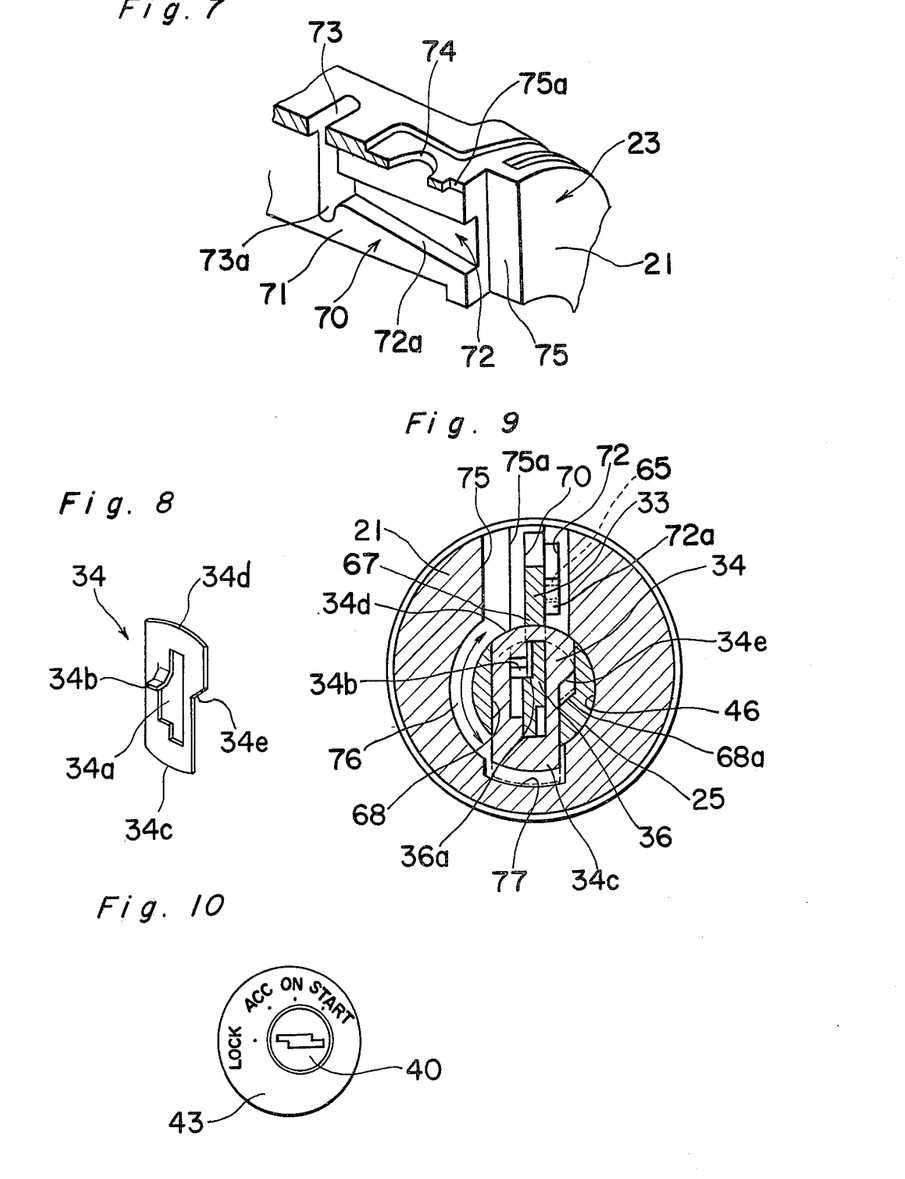
FIG. 7 is a perspective view of that portion of the cylindrical portion of the lock assembly shown in FIG. 6.
FIG. 8 is a perspective view of a slidable plate used in the cylindrical portion of the lock assembly.
FIG. 9 is a cross sectional view taken along the line IX—IX shown in FIG. 5.
FIG. 10 is a front end elevational view of the cylindrical portion showing an end cap and a decorative covering.

The plug C of the construction described above is, after having been inserted through the switch chamber 48 and then through the intermediate chamber 47 with the end cap 40 pointed towards the plug chamber 46, held in position inside the plug chamber 46. When the plug C is so held in position inside the plug chamber 46 as best shown in FIG. 2, not only is the cap 40 exposed to the outside through the open end of the plug chamber 46 at the opposite end of the plug from the intermediate chamber 47, but also the stop projection is engaged in a generally semi-circular indent defined at 79 in the cylindrical portion 21 and the cam projection 58 is also engaged slidingly with an annular land 78 defined in the cylindrical portion 21 between the plug chamber 46 and the intermediate chamber 47. Reference numeral 43 designates a centrally open, decorative cover snapped onto, or otherwise crimped to, one end of the cylindrical portion 21 with its outer peripheral edge portion engaged in a fitting groove 44 on said one end of the cylindrical portion 21. As best shown in FIG. 10, this decorative covering 43 has its outer annular face embossed or engraved with a plurality of, for example, four, legends "LOCK", "ACC.", "ON" and "START", which legends represent respective positions for the key 36 relative to the cylindrical portion 21 and are familiar to those skilled in the art as well as automobile drivers. It is to be noted that the semi-circular indent 79 in which the stop projection 25b is engaged extends circumferentially of the cylinder chamber 46 through a distance corresponding to the angular distance through which the key 36 correctly inserted in the plug C can be rotated between two extreme positions, that is, between the "LOCK" and "START" positions.

In the construction so far described, when the mating key 36 acceptable to the plug C of a particular key combination is inserted into the key groove 25a in the barrel 25 through the key hole in the cap 40, the barrel 25 is rotatable together with the key 36, the rotation of the barrel 25 being in turn transmitted to the rotor 52 of the rotary switch assembly 32 to bring the latter to one of a plurality of switching positions. If the key 36 is found to be incorrect with respect to the particular key combination of the plug C, no one can turn the key 36 even though the latter has completely been inserted into the key groove 25a in the barrel 25 for reasons well known to those skilled in the art, that is, for the reason that some or all of the tumbler plates 41 fail to move to the disengaged positions in response to the insertion of the key into the key groove 25a.

Figures 4, 5, 6:
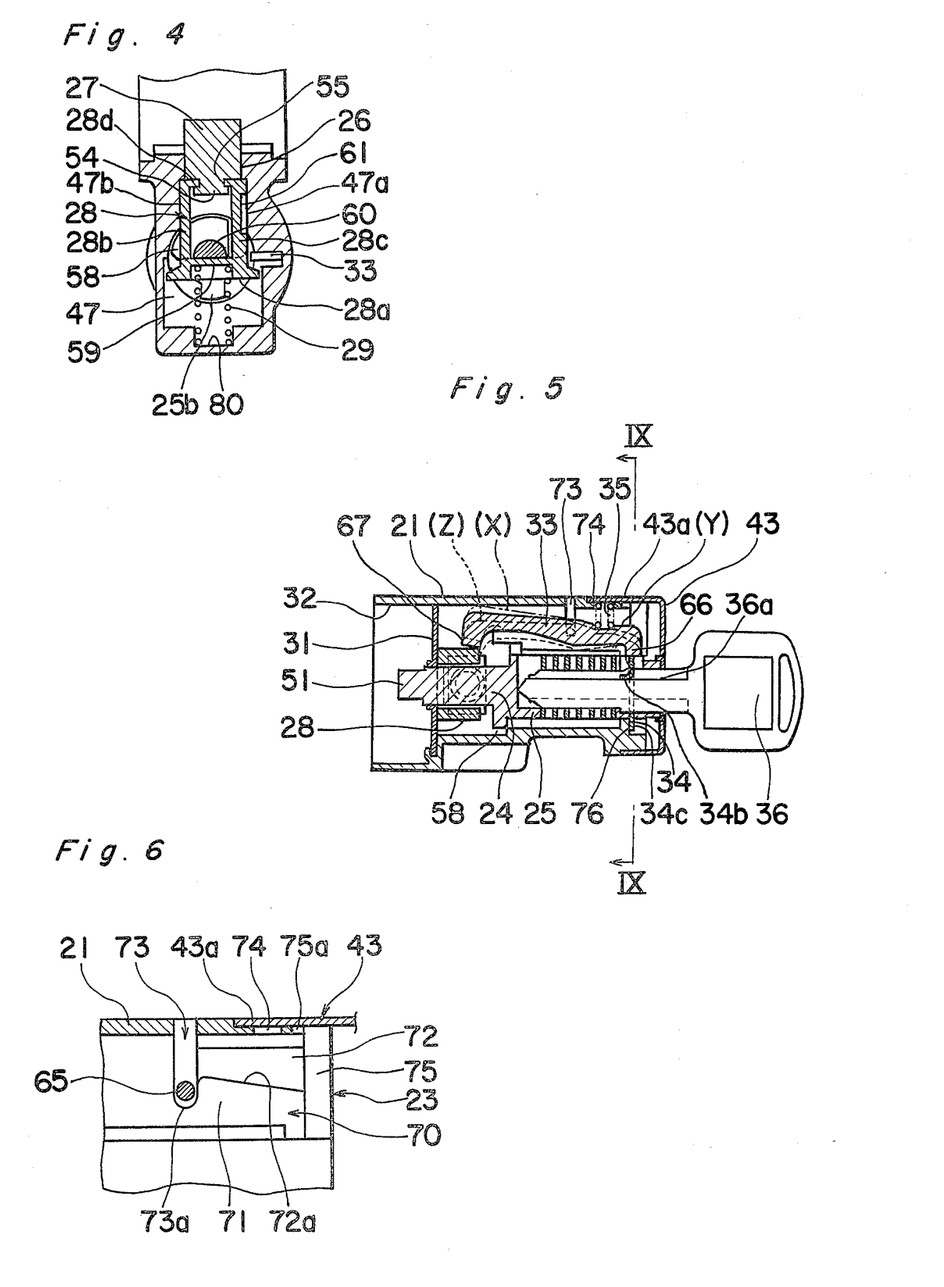
FIG. 4 is a cross sectional view taken along the line IV—IV in FIG. 2.
FIG. 5 is a longitudinal sectional view of a portion of the lock assembly taken at right angles to that shown in FIG. 2, showing the details of a plug employed in the lock assembly.
FIG. 6 is a longitudinal sectional view, on an enlarged scale, of a portion of a cylindrical portion of the lock assembly, showing a chamber for accommodating a rocking pawl.

The intermediate chamber 47 accommodating therein the drive device 30 has a generally rectangular shape having a length generally equal to the diameter of the switch chamber 48 and a width generally corresponding to the diameter of the plug chamber 46 as can readily be seen from FIGS. 2 and 4. This intermediate chamber 47 forming a part of the axial bore in the cylindrical portion 21 together with the plug chamber 46 and the switch chamber 48 is communicated to a generally U-shaped or semi-circularly cross-sectioned recess defined in the mounting portion 22 through a guide opening 26 defined in the lock housing 23, said guide opening 26 having a cross sectional shape similar to that of the locking bolt 27. This guide opening 26 provides a passage through which the locking bolt 27 moves in response to the movement of, and together with, the slide member 28 between the locked and unlocked positions.

While the plug chamber 46 is filled up by the barrel 25, the intermediate chamber 47 is separated from the switch chamber 48 by means of the partition wall member 31 having its outer peripheral edge portion secured to the inner surface of the cylindrical portion 21 which defines the axial bore in a manner as best shown in FIG. 5. As best shown in FIG. 3, this partition wall member 31 has a central opening 31a, which relatively rotatably supports the support disc 53 integral with the cam body 60, and an engagement lug 31b protruding radially outwardly therefrom for engagement in a guide groove 80 defined in the surface of the portion 21 defining the axial bore. It is to be noted that a portion of the guide groove 80 within the intermediate chamber 47 serves as a spring seat for the biasing spring 29 as can readily be understood from FIG. 4.

The slide member 28 movably housed within the intermediate chamber 47 has a one-piece construction constituted by a generally rectangular base plate 28a, a top plate 28d and a pair of spaced side plates 28b and 28c connected at their opposite ends to the base and top plates 28a and 28d, said slide member 28 having a generally rectangular space 28e which is defined among the plates 28a, 28b, 28c and 28d. This slide member 28 is so housed and so positioned within the intermediate chamber 47 that when the top plate 28d confronts the guide opening 26 and the base plate 28a traverses the guide groove 80, a major portion of the elongated cam body 60 of the cam member 24 loosely extends through the space 28e defined in the slide member 28. As hereinbefore described, this slide member 28 is normally biased by the biasing spring 29 so as to assume the locked position as shown in FIG. 4. The biasing spring 29 has one end seated in the guide groove 80 and the other end received in a spring seat 59 defined in the undersurface of the base plate 28a opposite to the space 28e as best shown in FIG. 4, and the base plate 28a is engaged with the cam body 60 when it is in the locked position.

The slide member 28 is connected to the locking bolt 27 in the following manner. The top plate 28d has a U-shaped engagement recess 56 defined therein and extending inwardly from one side edge of said top plate 28d facing the plug chamber 46. In other words, the U-shaped engagement recess 56 defined in the top plate 28d extends inwardly from one side edge thereof in a direction opposite to the direction in which the slide member 28 is inserted into the intermediate chamber 47 through the switch chamber 48 in a manner as will be described later.

On the other hand, the locking bolt 27 has an anchor 54 formed integrally with one end thereof and protruding therefrom in a direction facing the intermediate chamber 47. This anchor 54 has a U-shaped or annular engagement groove 55 defined therein at a position adjacent the locking bolt 27 for receiving a lip region of the U-shaped engagement recess 56 in a manner as best shown in FIG. 4. The intended connection of the locking bolt 27 with the slide member 28 can readily be carried out by inserting the locking bolt 27 into the guide opening 26 with the anchor 54 pointed towards the intermediate chamber 47 and then inserting the slide member 28 into the intermediate chamber 47 through the switch chamber 48. By so doing, the engagement recess 56 in the top plate 28d of the slide member 28 receives the anchor 54 to connect the slide member 28 to the locking bolt 27.

The base plate 28a has its front edge portion 57 protruding towards the barrel 25 as best shown in FIG. 2 for engagement by the cam projection 58 of the cam member 24. This front edge portion 57 and the cam projection 58 are so shaped and so sized that, as the barrel 25 is rotated together with the inserted key 36 from the "LOCK" position towards any one of the other positions, i.e., any one of "ACC.", "ON" and "START" positions, the cam projection 58 is brought into engagement with the front edge portion 57 of the base plate 28a, thereby causing the slide member 28 to move from the locked position towards the unlocked position together with the locking bolt 27 against the biasing spring 29. During the movement of the slide member 28 between the locked and unlocked position, the slide member 28 is guided by the surrounding wall defining the intermediate chamber 47, which surrounding wall includes a portion of the partition wall member 31 and lateral opposite wall portions identified respectively by 47a and 47b in FIG. 4.

The rotary switch assembly 32 employed is of a type known as an automobile ignition switch assembly and is housed within the switch chamber 48 and fixed in position by means of one or more set bolts 50 threaded into the lock housing 23 after having passed through a terminal base 49 fast with the switch assembly 32 as shown in FIG. 2. The insertion of the switch assembly 32 into the switch chamber 48 is carried out after the barrel 25 and the slide member 28 have successively been inserted into the plug chamber 46 and the intermediate chamber 47 and after the partition wall member 31 has subsequently been set in position between the intermediate chamber 47 and the switch chamber 48. It will readily be seen that the actuator projection 51 on the cam body 60 of the cam member 24 is automatically engaged in the engagement recess 52a in the rotor 52 of the switch assembly 32 upon completion of insertion of the switch assembly 32 into the switch chamber 48.

In the construction so far described, it is clear that, since the slide member 28 is biased by the biasing spring 29, the rotation of the barrel 25 resulting from the rotation of the inserted key 36 from one of the "ACC.", "ON" and "START" positions back to the "LOCK" position allows the slide member 28 to return to the locked position with the locking bolt 27 held in position to lock the steering shaft ST. This may cause an inconvenience known to those skilled in the art as well as most automobile drivers, and an arrangement is usually desired to prevent the slide member 28, once moved to the unlocked position against the spring 29 as a result of rotation of the inserted key 36 from the "LOCK" position to any one of the other positions, from being automatically moved back to the locked position simultaneously with the reverse rotation of the inserted key 36 back to the "LOCK" position and to keep the slide member 28 in the unlocked position so long as the key 36 remains inserted in the key groove 25a and unless the inserted key 36 is withdrawn or removed from the key groove 25a. For this purpose, a retaining mechanism 37 is employed in the steering lock assembly according to the present invention, the details of which will now be described with particular reference to FIGS. 3 and 5 to 9.

As best shown in FIGS. 3 and 5, the rocking pawl 33 has at its opposite ends integrally formed respective detents 66 and 67 protruding in the same direction laterally therefrom generally at right angles to the longitudinal extent of said rocking pawl 33, and also has a bearing pin 65 laterally protruding from a substantially intermediate portion of said rocking pawl 33. For the purpose which will become clear from the subsequent description, the rocking pawl 33 has in one lateral edge 33a a bearing recess 33b positioned substantially between the bearing pin 65 and the detent 66 and on one side of the longitudinal axis of the rocking pawl 33 opposite to the detent 66.

For accommodating the rocking pawl 33, one end portion of the cylindrical portion 21 has a slit-like groove 70 extending radially outwardly from the plug chamber 46 and terminating inwardly adjacent the outer periphery of said one end portion of the cylindrical portion 21, said groove 70 being bounded by a pair of opposite walls 71 which are spaced a distance slightly larger than the thickness of the rocking pawl 33. As best shown in FIGS. 6 and 7, one of the opposite walls 71 bounding the groove 70 therebetween has a guideway 72 extending in a direction generally parallel to the longitudinal axis of the plug chamber 46 from a portion of the annular end face of the cylindrical portion 21 and terminating at a position corresponding to a substantially intermediate portion of the plug chamber 46. The wall bounding the guideway 72 radially adjacent the plug chamber 46 is diagonally upwardly sloped at 72a in a direction facing the intermediate chamber 47 for the purpose as will become clear from the subsequent description. Each of the walls 71 is also provided with a radially inwardly extending bearing recess 73a. The guide way 72 and the bearing recess 73a both formed in the wall 71 bounding the groove 70 are so shaped and so positioned relative to each other that, as the rocking pawl 33 is inserted into the groove 70 from above the end cap 40 prior to the decorative covering 43 being rigidly secured to the end of the cylindrical portion 21, the bearing pin 65 on the rocking pawl 33 can be guided in the guideway 72 while sliding along the corresponding sloped wall 72a until it falls into the bearing recess 73a as shown in FIG. 6. When the rocking pawl 33 is held in position within the groove 70, the detents 66 and 67 integral with the rocking pawl 33 are respectively positioned adjacent one of the side plates, for example, the side plate 28c, of the slide member 28 and one end of the barrel 25 opposite to the cam member 24, the details of which will be described later. The lock housing 23 including the slit-like groove 70, the guideway 72 in the wall 71 bounding the groove 70 and the recess 73a is a one-piece construction formed by the use of any known mold casting technique.

The rocking pawl 33 so positioned inside the groove 70 is pivotable between operative and inoperative positions about the bearing pin 65 in a plane perpendicular to the longitudinal axis of the barrel 25 and also to the direction of movement of the slide member 28 between the locked and unlocked positions. When the mating key 36 is not inserted into the groove 25a in the barrel 25, the pawl 33 is biased to the inoperative position as shown by the chain line X in FIG. 5 by the action of the biasing spring 35. The biasing spring 35 is a compression spring having one end engaged in the bearing recess in the rocking pawl 33 and the other end positioned in a mounting hole 74 defined in a portion of the wall of the cylindrical portion 21 which is radially aligned with the groove 70, a substantially intermediate portion of said biasing spring 35 extending radially of the cylindrical portion 21 within the groove 70 and between the walls 71 bounding the groove 70. This biasing spring 35 is held in position by an axially protruding flange portion 43a of the decorative covering 43 which is secured to that end portion of the cylindrical portion 21 so as to overlay the other end of the biasing spring 35 as best shown in FIG. 5.

It is to be noted that the bearing recess 73a for pivotally receiving therein the bearing pin 65 is so sized and so shaped as to permit the bearing pin 65 to be firmly held in said bearing recess 73a, without any possibility of being separated therefrom, whenever the rocking pawl 33 being pivoted in a manner as will be described later assumes any one of positions including the inoperative position X and the operative position as shown by the broken line Z in FIG. 5.

The pivotal movement of the rocking pawl 33 within the groove 70 can be controlled by the slidable plate 34 substantially in response to the insertion and withdrawal of the key 36 into and from the key groove 25a in the barrel 25. As best shown in FIGS. 3, 8 and 9, the slidable plate 34 has its opposite ends rounded at 34c and 34d to conform to the curvature of the periphery of the barrel 25, the minimum length of which is larger than the diameter of the barrel 25. This slidable plate 34 has formed in a substantially intermediate portion thereof a slot 34a extending in parallel to the longitudinal direction of said plate 34 and also with a tongue 34b engageable a lateral ridge 36a formed in the key 36 so as to extend in a direction parallel to the longitudinal axis of said key 36 as best shown in FIGS. 3 and 5. This tongue 34b extends from one peripheral edge portion of the slot 34a near the rounded end 34d a certain distance in a direction towards the rounded end 34c and is gently bent to protrude in a direction generally perpendicular to the plane of one surface of the slidable plate 34 while partially extending over the slot 34a as best shown in FIG. 8. For the reason which will become clear from the subsequent description, a portion of one side edge of the slidable plate 34 adjacent the rounded end 34d has a step defined at 34e.

This slidable plate 34 is operatively carried by the barrel 25 in a manner which will now be described. As best shown in FIG. 3, the barrel 25 forming a part of the plug C has a guide groove 68 defined therein at a position adjacent the capped end thereof and remote from the cam member 24 and extending from a portion of the periphery thereof to the opposite portion of the same in a direction radially of the barrel 25 while traversing the key groove 25a in the barrel 25. As shown in FIGS. 5 and 9, the slidable plate 34 is loosely accommodated within the guide groove 68 with the tongue 34b situated in the key groove 25a and pointed in the direction of insertion of the mating key 36. With the slidable plate 34 so accommodated in the guide groove 68 in the barrel 25, the slidable plate 34 is urged to an engaged position, as shown by the phantom line in FIG. 9, by the action of the biasing spring 35, the biasing force of which is transmitted to said slidable plate 34 through the rocking pawl 33 because the detent 66 of the rocking pawl 33 is, in the assembled condition, constantly engaged with the rounded end 34d of the slidable plate 34. When the slidable plate 34 is in the engaged position as biased by the biasing spring 35 in the manner as hereinabove described, the rounded end 34c of the slidable plate 34 protrudes a certain distance outwardly from the periphery of the barrel 25 and is, while the step 34e in the slidable plate 34 is at the same time engaged with a shoulder 68a defined in the guide groove 68, engaged in a detent recess 77 in the inner peripheral wall of the plug chamber 46, to hold the barrel 25 against rotation.

However, this slidable plate 34 can be moved from the engaged position towards a disengaged position against the biasing force of the biasing spring 35 transmitted thereto by means of the detent 66, as the mating key 36 is inserted into the key groove 25a in the barrel 25. More specifically, as the mating key 36 is inserted into the key groove 25a through the key hole in the cap 40, the slidable plate 34 is moved in a direction towards the rocking pawl 33, or upwardly as viewed in FIGS. 5 and 9, with the tongue 34b riding on the lateral ridge 36a in the mating key 36 being inserted. The disengaged position of the slidable plate 34 is shown by the solid line in FIG. 9 and, in this condition and so long as the slide member 28 is held in the locked position as shown in FIGS. 2 and 4, the rocking pawl 33 assumes a floating position as shown by the solid line in FIG. 5 for the reason which will now be described.

As best shown in FIGS. 4 and 5, while the rocking pawl 33 is held in position within the groove 70 with the detent 66 constantly engaged with the rounded end 34d of the slidable plate 34 by the action of the biasing spring 35 as hereinbefore described, the detent 67 on the opposite end of the pawl 33 from detent 66 is slidingly engaged with the lateral outer surface of the side plate 28c of the slide member 28. This detent 67 is engageable in a detent recess 61 in the side plate 28c at a position adjacent the top plate 28d of the slide member 28 so that, when the detent 67 is engaged thereinto incident to the pivotal movement of the rocking pawl 33 to the operative position shown by the broken line Z in FIG. 5, the slide member 28 can be locked in the unlocked position so long as the mating key 36 remains inserted in the key groove 25a in the barrel 25. The engagement of the detent 67 in the detent recess 61 in the side plate 28c of the slide member 28 takes place when the slide member 28, in the locked position as shown in FIGS. 2 and 4, is moved to the unlocked position by the rotation of the barrel 25 with the mating key 36 inserted in the movement from key groove 25a. This is because, as hereinbefore described, the rotation of the barrel effected as a result of the turning of the mating key 36 is transmitted to the slide member 28 through the cam projection 58 of the cam member 24 fast with the barrel 25. It is to be noted that, during the rotation of the plug C with the key 36 inserted into the key groove 25a in the barrel 25, the rounded end 34c of the slidable plate 34 then held in the disengaged position moves in an arcuate cutout 76 in the inner wall of the plug chamber 46 so as to extend circumferentially of the plug chamber 46 in communication with the detent recess 77 as best shown in FIG. 9. It is also to be noted that the detent recess 77 and the arcuate cutout 76 are so shaped relative to the rounded end 34c of the slidable plate 34 that, whether the rounded end 34c of the slidable plate 34 is engaged in the detent recess 77 or in the arcuate cutout 76, any possible axial displacement of the barrel 25 in a direction towards the intermediate chamber 47 can be substantially eliminated or minimized.

The steering lock according to the present invention is constructed as hereinbefore described, and it operates in the following manner. Assuming that the steering shaft ST is locked by the locking bolt 27 with the slide member 28 held in the locked position as shown in FIGS. 2 and 4 and assuming that the mating key 36 is subsequently inserted into the key groove 25a in the barrel 25, the plug C is released and the barrel 25 is rotatable by turning the inserted key 36. However, as the mating key 36 is inserted into the key groove 25a, the slidable plate 34 is upwardly shifted from the engaged position towards the disengaged position with the tongue 34b in said slidable plate 34 slidingly riding on the lateral ridge 36a of the mating key 36. On the other hand, since the detent 67 of the rocking pawl 33 is engaged with the side plate 28c of the slide member 28 without being engaged in the detent recess 61 so long as the slide member 28 is held in the locked position, the upward shift of the slidable plate 34 as viewed in FIGS. 5 and 9 causes the rocking pawl 33 to assume a floating position Y without the bearing pin 65 being disengaged from the bearing recess 73a.

Subsequent rotation of the inserted key 36 from the "OFF" position to, for example, the "ACC." position results in lowering, as viewed in FIGS. 2 and 4, of the slide member 28 from the locked position towards the unlocked position against the biasing spring 29. This is because the rotation of the inserted key 36 is accompanied by a corresponding rotation of the barrel 25 together with the cam member 24 and the cam projection 58 is brought into engagement with the front edge portion of the base plate 28a of the slide member 28 to lower the latter against the biasing spring 29. As soon as the slide member 28 arrives at the unlocked position, not only is the locking bolt 27 disengaged from the detent recess 20 to unlock the steering shaft ST, but also the detent 67 on the rocking pawl 33 is engaged in the detent recess 61 in the side plate 28c of the slide member 28 to lock the latter in the unlocked position with the rocking pawl 33 assuming the operative position shown by the broken line Z in FIG. 5.

The above description equally applies even when the inserted key 36 is rotated from the "LOCK" position to any one of the "ON" and "START" positions past the "ACC." position.

On the other hand, when the inserted key 36 is rotated in the reverse direction from the "ACC.", "ON" or "START" position back to the "LOCK" position, unless the inserted key 36 is withdrawn from the key groove 25a in the barrel 25, the steering shaft ST will not be locked and the slide member 28 remains locked in the unlocked position with the rocking pawl 33 still held in the operative position. However, the subsequent withdrawal of the inserted key 36 from the key groove 25a in the barrel 25 results not only in the locking of the plug C, but also in the return movement of the rocking pawl 33 from the operative position Z to the inoperative position shown by the chain line X in FIG. 5 by the action of the biasing spring 35 accompanied by the corresponding return movement of the slidable plate 34 from the disengaged position to the engaged position. The return of the rocking pawl 33 to the inoperative position X disengages the detent 67 from the detent recess 61 in the side plate 28c of the slide member 28 and, accordingly, by the action of the biasing spring 29, the slide member 28 is immediately moved upwardly, as viewed in FIGS. 2 and 4, from the unlocked position to the locked position to lock the steering shaft ST.

It is to be noted that, since the rotary switch assembly 32 is of a type known as an automobile iginition switch assembly as hereinbefore described, the details and function of the rotary switch assembly 32 are well known to those skilled in the art. Briefly speaking, when the rotor 52 of the rotary switch assembly 32 is rotated to a position corresponding to the "ACC." position of the key 36, a power control switch provided between an automobile battery source and an automobile electric system including radio, heater etc. is closed; when the rotor 52 is rotated to another position corresponding to the "ON" position of the key 36, not only is the power control switch closed, but also an ignition switch is closed to bring an automobile ignition system into operation; and when the rotor 52 is rotated to a further position corresponding to the "START" position of the key 36, not only is the ignition switch closed, but also a starter switch necessary to connect the engine cranking motor to the battery source is closed. As is well known to those skilled in the art, the rotary switch assembly 32 has a biasing spring element incorporated therein for biasing the rotor 52 to return automatically to the position corresponding to the "ON" position of the key 36 after it has been rotated to said further position corresponding to the "START" position and an external force applied to turn the key 36 from the "ON" position to the "START" position has been released. The biasing spring incorporated in the rotary switch assembly 32 acts also on the inserted key 36 through the cam member 24 and, accordingly, the key once moved from the "ON" position to the "START" position can return to the "ON" position immediately after the external force applied to turn the key 36 has been released.

Hereinafter, the manner by which the steering lock assembly of the construction and function as hereinbefore fully described according to the present invention is assembled will be described with particular reference to FIG. 3.

The plug 24 after the cap 40 has been mounted on the end of the barrel 25 remote from the cam member 24 and after the tumbler plates 41 and their associated springs 42 have been set in position in the barrel 25, is inserted into the plug chamber 46 through the switch chamber 48 and then the intermediate chamber 47 with the capped end of the barrel 25 protruding outwardly of the open end of the cylindrical portion 21 opposite to the switch chamber 48 and until the stop projection 25b on with the barrel 25 and the cam projection 58 abut respectively against the semi-circular indent 79 and the annular land 78. Then, while the locking bolt 27 is inserted into the guide opening 26 with the anchor 54 pointed towards the intermediate chamber 47 in a direction perpendicular to the longitudinal axis of the barrel 25, the slide member 28 and the biasing spring 29 are inserted into the intermediate chamber 47 through the switch chamber 48. During the insertion of the slide member 28 into the intermediate chamber 47 together with the biasing spring 29, care is required to allow the anchor 54 fast with the locking bolt 27 and protruding into the intermediate chamber 47 to be received in the U-shaped engagement recess 56 in the top plate 28d of the slide member 28 to connect the locking bolt 27 with the slide member 28 so that the both can move together, and also to allow the cam body 60 to pass through the space 28e defined in the slide member 28.

After the drive device 30 has been set in position inside the intermediate chamber 47, the partition wall member 31 is fixed in position between the intermediate and switch chambers 47 and 48 to the inner wall of the cylindrical portion 21. Subsequent to the setting of the partition wall member 31, the rotary switch assembly 32 is inserted into the switch chamber 48 in such a manner as to allow the actuator projection 51 of the cam member 24 fast with the barrel 25 to be exactly engaged into the engagement recess 52a in the rotor 52 of the rotary switch assembly 32 and then the terminal base 49 is secured to the cylindrical portion 21 to close the open end of the cylindrical portion 21 adjacent the switch chamber 48 and also to firmly set the switch assembly 32 in position inside the switch chamber 48.

By so doing, the plug C, the slide member 28, the locking bolt 27 and the switch assembly 32 are all set in position inside the axial bore in the cylindrical portion 21, all of which are mounted successively into the axial bore in the cylindrical portion 21 in a direction from the open end of the portion 21 adjacent the switch chamber 48.

Thereafter, the slidable plate 34, the rocking pawl 33 and the biasing spring 35 are successively set in position, followed by the mounting of the decorative covering 43. Specifically, the insertion of the slidable plate 34 into the guide groove 68 in the barrel 25 is carried out via a radial guide groove 75 defined in the annular end face of the cylindrical portion 21 adjacent the plug chamber 46 and extending from the inner periphery to the outer periphery of that end portion of the cylindrical portion 21. It is to be noted that, in view of the particular shape of the slidable plate 34 with the tongue 34b protruding perpendicular to the body of the plate 34, the radial guide groove 75 has a radial gutter 75a so shaped and so sized as to allow the tongue 34b to pass therethrough when the slidable plate 34 being inserted is guided along the radial groove 75 towards the guide groove 68 in the barrel 25.

After the slidable plate 34 has been set in position, the rocking pawl 33 is inserted into the groove 70 from the open end of the cylindrical portion 21 adjacent the plug chamber 46. During the insertion of the rocking pawl 33 into the groove 70, a simple push (while the rocking pawl 33 is pointed with the detent 67 oriented towards the groove 70) is sufficient to allow the rocking pawl 33 to be set in position inside the groove 70 because the bearing pin 65 laterally protruding from the rocking pawl 33 is guided deep into the groove 70 along the guideway 72 while slidingly moving along the sloped wall 72a until it falls into the bearing recess 73a. Subsequently, the biasing spring 35 is inserted through the mounting hole 74 until the leading end of the spring 35 with respect to the direction of insertion thereof is engaged in the bearing recess 33b on the lateral edge 33a of the rocking pawl 33.

The final procedure is to mount the decorative covering 43 on the end portion of the cylindrical portion 21. At this time, care is required to avoid any possible jump of the biasing spring 35 out of the mounting hole 74. For this purpose, during the mounting of the decorative covering 43 on the end portion of the cylindrical portion 21, the biasing spring 35 must be axially inwardly compressed to allow the axial flange 43a to pass over the other end of the spring 35 situated within the mounting hole 74 prior to the free end of the axial flange 43a crimped to the outer periphery of the cylindrical portion 21.

It is to be noted that, at the time of completion of the assembly of the steering lock assembly according to the present invention, the plug C is held in the "LOCK" position and, accordingly, the slide member 28 is held in the locked position.

From the foregoing full description of the present invention, it has now become clear that the steering lock assembly can be manufactured with a minimum number of component parts which brings advantageously about reduction in size and weight of the overall steering lock assembly. Specifically, according to the present invention, not only is the necessity of the outer hollow cylinder or sleeve discrete from the overall housing for the plug, which has heretofore been required in the prior art cylinder lock structure, eliminated since the wall of the cylindrical portion 21 surrounding the barrel 25 serves the purpose, but also the one-piece construction of the barrel 25 with the cam member 25 is effective to substantially eliminate any possible generation of rattling or clattering noises, which would occur if they are separate members as is the case with the conventional steering lock assembly, and also to minimize the number of component parts to be assembled together.

Although the present invention has fully been described in connection with the preferred embodiment thereof with reference to the accompanying drawings, it is to be noted that various changes and modifications are apparent to those skilled in the art. By way of example, it is possible to employ a leaf spring instead of the biasing spring 35, in which case the mounting hole 74 may not be necessary.

Such changes and modifications are to be understood as being included within the true scope of the present invention unless they depart therefrom.

We claim:

1. A steering lock assembly which comprises, in combination:

a lock housing having a cylindrical portion with an unobstructed axial bore therein and opening out of the opposite ends of said cylindrical portion, and a generally U-shaped mounting portion extending generally laterally away from the cylindrical portion and having a guide opening therein in communication with said axial bore, one portion of said axial bore at one end thereof being a plug accommodating portion and having a diameter smaller than that of the remainder of said axial bore, and said cylindrical portion having a radially extending shoulder between said smaller diameter bore portion and the remainder thereof;

a locking member movably supported in said guide opening and movable between locking and unlocking positions for locking and unlocking an automobile steering shaft and having the end toward said axial bore extending into said axial bore when said locking member is in the locking position and being movable toward said axial bore to the unlocked position;

a plug operatively housed in said smaller diameter portion of said axial bore and having one end at said one end of said cylindrical portion, and a cam member integral with said plug at the other end of said plug, said plug having an axially extending key groove therein for receiving a mating key, said plug being rotatable together with said cam member through a predetermined angle between inoperative and operative positions around the longitudinal axis thereof only when the mating key inserted in said key groove is turned, said plug including means engagable with said cylindrical portion for blocking rotation of said plug in the absence of the mating key in the key groove and permitting rotation of said plug after insertion of the mating key in the key groove, said blocking means having the capability of discriminating whether or not the mating key inserted in the key groove is correct and acceptable to the plug and accepting only the correct and acceptable key;

a slide member movably mounted in said axial bore at a position aligned with said guide opening for movement transversely of the axis of said bore between locked and unlocked positions, said slide member being laterally movable into said axial bore from the other end thereof and having coupling means for coupling with said locking member in response to such lateral movement for, when moved between said locking and unlocking positions, driving said locking member to lock and unlock the steering shaft, said cam member engaging said slide member for moving said slide member from the locked position towards the unlocked position in response to rotation of said plug from the inoperative position towards the operative position;

means for biasing the slide member toward the locked position for moving said slide member from the unlocked position toward the locked position in response to the rotation of said plug from the operative position towards the inoperative position;

a key operated electric switch means housed in the axial bore adjacent the other end of said cylindrical portion, said electric switch means being insertable into said axial bore from said other end thereof and being capable of assuming at least first and second switching positions when the plug is in the inoperative and operative positions, respectively, said cam means being connected to said electric switch means for moving said electric switch means between switching positions in response to movement of said plug between inoperative and operative positions;

a rocking pawl rockably mounted in a chamber of said housing contiguous to said axial bore for rocking movement radially of said plug and in a plane perpendicular to the path of movement of said slide member and having one end directly engaged with said slide member when said rocking pawl is rocked to an operative position and said slide member is moved to the unlocked position for blocking movement of said slide member and said locking member to the locked position and key actuated means movably mounted in said plug for engaging the other end of said rocking pawl for moving said rocking pawl to said operative position in response to insertion of the key in said key groove and holding said rocking pawl in said operative position until said key is removed from said key groove;

a stop projection integral with said plug and protruding radially outwardly from one end of said plug and engaged with said shoulder when said plug is in position in said smaller diameter portion of said bore for blocking axial movement of said plug in a direction toward said one end of said cylindrical portion; and retaining means for retaining said plug from being axially displaced in a direction toward said other end of said cylindrical portion.

2. A locking assembly as claimed in claim 1 wherein said cam member comprises an elongated body extending in a direction toward said switch assembly and operatively coupled to said switch assembly.

3. A locking assembly as claimed in claim 2 wherein said cam member further has a cam projection drivingly engaged with said slide member for transmitting the rotation of the plug during rotation from the inoperative to the operative position to said slide member, said cam projection being slidingly engaged with said shoulder and thereby constituting further means for blocking axial movement of said plug in a direction toward said one end of said cylindrical portion.

4. A lock assembly as claimed in claim 2 or 3 wherein said key actuated means comprises a generally elongated slidable plate having a key slot therein for the passage of the mating key therethrough during the insertion and withdrawal of the mating key into and from the key groove in said plug, said slidable plate being slidably mounted in said plug at the end thereof remote from said cam member and with the key slot aligned with the key groove for sliding movement between engaged and disengaged positions in a direction perpendicular to the longitudinal axis of said plug, said slidable plate having said retaining means as a part thereof, said retaining means being constituted by an end portion of said slidable plate extending beyond the periphery of said plug, and a portion of the inner peripheral edge of said cylindrical portion at said one end thereof having a cutout therein receiving the end portion of said slidable plate which protrudes radially outwardly beyond the periphery of said plug.

5. A locking assembly as claimed in claim 4 wherein said slidable plate has a tongue integral therewith and protruding from a portion of the periphery of the key slot in a direction generally perpendicular to said slidable plate, said tongue being engagable with the mating key when the mating key is inserted into the key groove through the key slot to shift said slidable plate from the engaged position toward the disengaged position.

6. A locking assembly as claimed in claim 4 wherein said slide member comprises a one-piece construction member having a pair of side plates and a base plate connecting said side plates at one end and a top plate connecting the opposite ends of said side plates together, said top plate having a generally U-shaped socket therein and constituting said coupling means, said cam projection being drivingly engaged with said base plate, and wherein the end of said locking member adjacent said slide member has an anchor thereon for engagement in said U-shaped socket when said slide member in inserted into said axial bore.

7. A lock assembly as claimed in claim 6 wherein said biasing means comprises a coil spring interposed between said base plate and a portion of the wall of said axial bore.

8. A lock assembly as claimed in claim 4 wherein said cutout is a generally peripherally extending detent cutout, the angle of the periphery through which said detent cutout extends corresponding to the angle through which the plug rotates among the operative and inoperative positions.

9. A lock assembly as claimed in claim 1 further comprising a partition wall member removably mounted within said axial bore between said key-operated electric switch assembly and said slide member, said partition wall member having a guide wall against which said slide member slides for guiding the movement of the slide member between the locked and unlocked positions.

* * * * *